Oct. 18, 1938.   C. P. LENT   2,133,392
ELECTRIC TOASTER
Filed Jan. 20, 1936   3 Sheets-Sheet 1
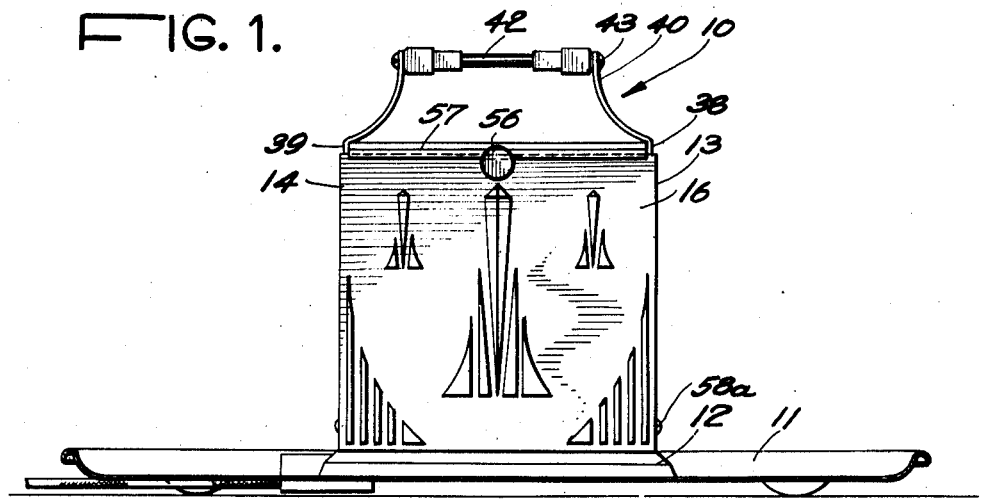
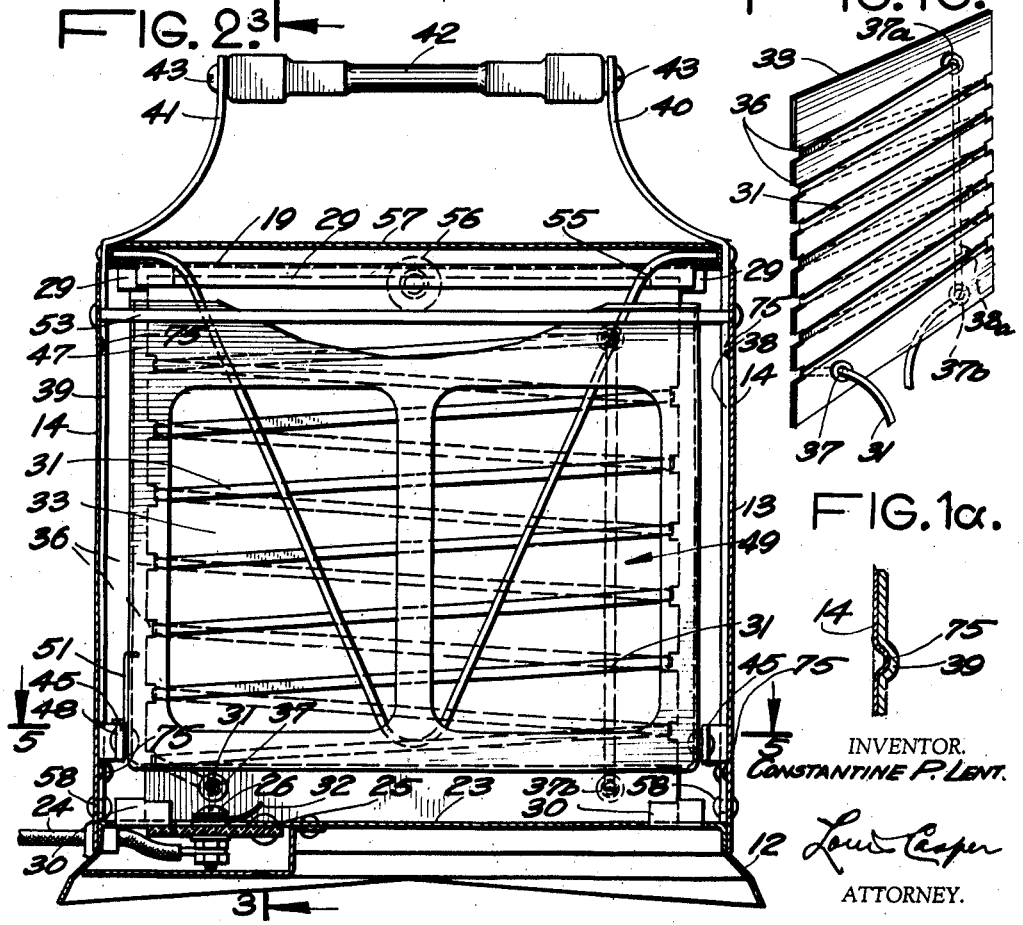
INVENTOR.
CONSTANTINE P. LENT.
Louis Cooper
ATTORNEY.

Oct. 18, 1938.  C. P. LENT  2,133,392
ELECTRIC TOASTER
Filed Jan. 20, 1936  3 Sheets-Sheet 2
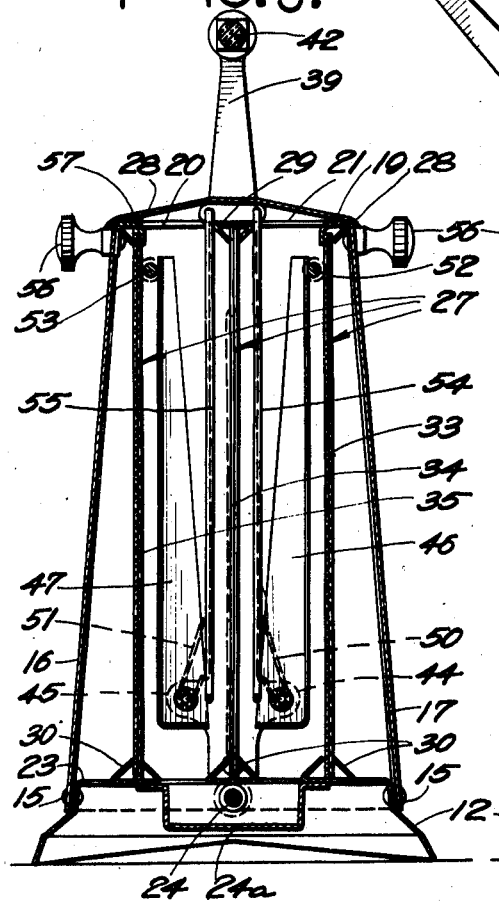
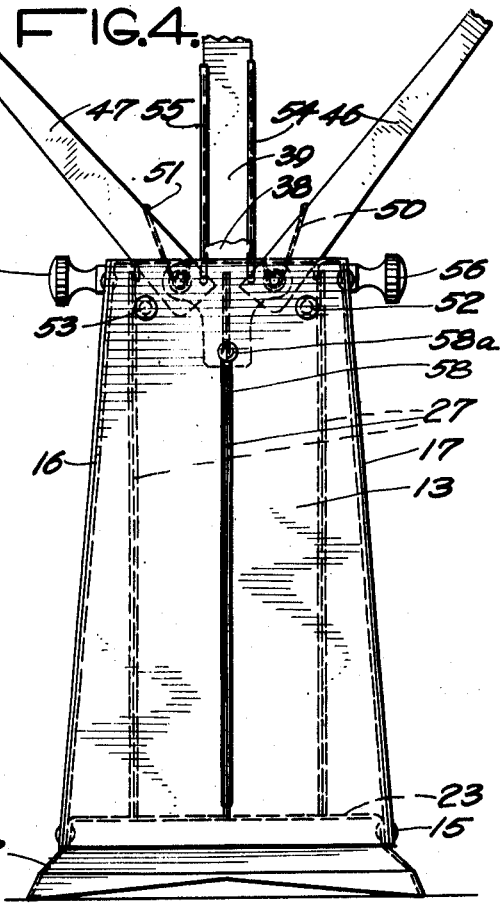
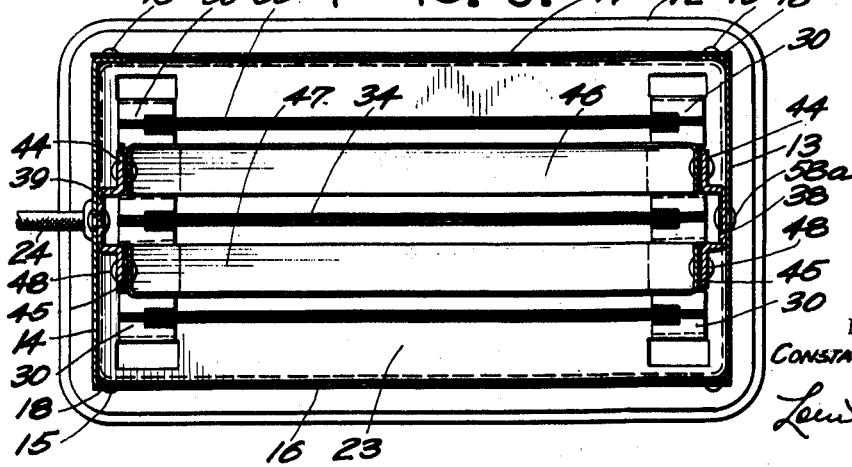
INVENTOR.
CONSTANTINE P. LENT.
ATTORNEY.

Oct. 18, 1938.  C. P. LENT  2,133,392
ELECTRIC TOASTER
Filed Jan. 20, 1936  3 Sheets-Sheet 3
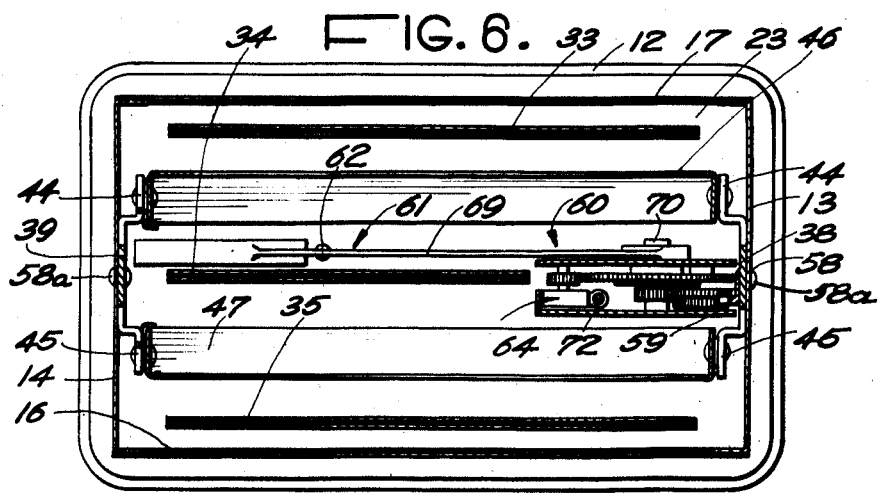
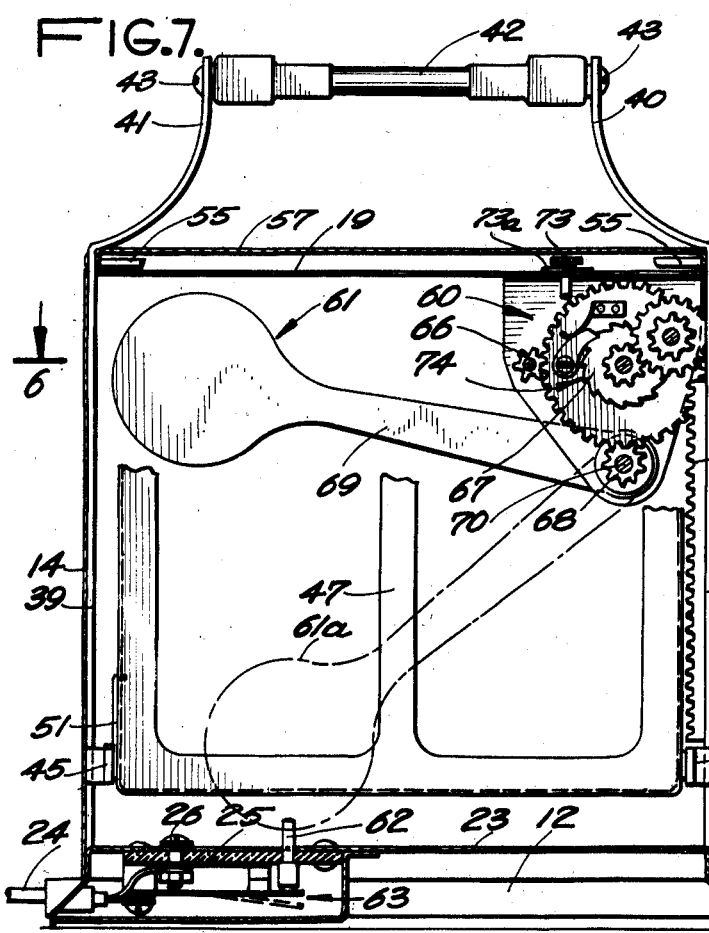
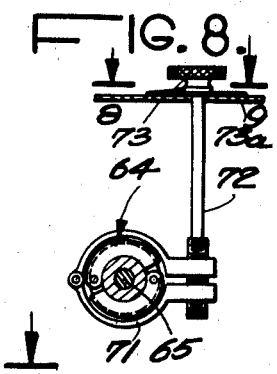
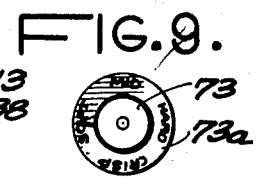
INVENTOR.
CONSTANTINE P. LENT.
ATTORNEY.

Patented Oct. 18, 1938

2,133,392

UNITED STATES PATENT OFFICE 2,133,392

ELECTRIC TOASTER

Constantine P. Lent, New York, N. Y.

Application January 20, 1936, Serial No. 59,869

7 Claims. (Cl. 219—19)

My invention relates to electric toasters for use in connection with the toasting of slices of bread or the like, and also relates to the class of electric toasters that are applicable for broiling meats and the like in addition to that of toasting slices of bread.

The added utility of this invention as stated is made possible due to the utilization of a double heating element.

A further object of this invention is to provide a novel design toaster that is capable of toasting both sides of a slice of bread simultaneously.

A further object of this invention is to provide means that will enable the user to place bread or the like that is intended to be toasted upon a plurality of racks (in this particular case there are two racks), said bread being positioned at an inclined angle with respect to the toaster proper. By this means the user's hands will be sufficiently removed from the toaster elements to reduce the liability of burnt fingers to a minimum.

A further object is to provide a toaster so arranged that by a simple movement of the hand, the user will be enabled to pull the racks aforementioned out of the toaster aforesaid for loading of the same, and after said operation to push said racks in again.

A further object is to provide a combination toaster and tray, the latter intended to hold bread or the like.

A further object is to provide a novel design toaster that will automatically control the time necessary for the toasting of bread. The aforementioned time control is adjustable with respect to time variations, and said control will shut off the current at the termination of the time interval desired. The switching unit employed for the aforementioned current "cut off" employs a counterpoise weight in lieu of springs or the like.

Further objects will be seen as the description of the invention proceeds.

Referring to the drawings—

Fig. 1 is an exterior view of the toaster in combination with the tray.

Fig. 1a in connection with Fig. 2 is a detail showing a method of locking a pair of slidably mounted toaster racks in position.

Fig. 2 is a front sectional view of the toaster exposing the bread racks and heating elements.

Fig. 3 is a section of the toaster taken on a line 3—3 of Fig. 2.

Fig. 4 is an outside side view of the toaster showing the racks in position for loading.

Fig. 5 is a plan view of the toaster taken on a line 5—5 of Fig. 2.

Fig. 6 is a similar plan view of the toaster as shown in Fig. 5 except that the timing element feature is utilized; the latter section is taken on a line 6—6 of Fig. 7.

Fig. 7 is a front section through the toaster showing the relation of parts involving the timing element.

Fig. 8 is a sectional view through the governor arrangement, the latter being used to adjust the time interval for the toasting of the bread.

Fig. 9 is a plan view showing the regulating plate for the timing adjustment taken on a line 8—8 of Fig. 8.

Fig. 10 is a detail view of the heating element and the mounting thereof.

Referring to Fig. 1, the numeral 10 represents the toaster proper resting upon the tray 11. The toaster and tray may be combined in one unit with the base 12 of the toaster resting upon the tray; or the two parts mentioned may be made separately.

The toaster 10 is provided with side frames 13 and 14 shown in Fig. 2. The aforementioned frames are preferably bent at their outer sides 15 in such a manner that they form a U-shaped frame as shown in Fig. 5.

A front plate 16 and a rear plate 17 are secured to the side frames 13 and 14 by means of screws or rivets 18.

The side frames 13 and 14 and the front and rear plates 16 and 17 can be welded into one piece.

A design may be embossed or painted on the sides of the toaster as shown in Fig. 1.

A top plate 19 having elongated openings 20, 21 is secured to the top portion of the toaster. The base 12 is provided with a top section 23 which is secured by means of the screws 15 to the sides of the toaster as shown in Fig. 3.

The electric wire 24 is secured and connected on an insulated plate 25 which in turn is secured to the top section 25 of the base 12. The screw terminals 26 serve to hold the electric conductor 24 to the toaster proper.

A set of heating elements 27 (in this case there are 3 such elements), are located inside the toaster and are held in place by means of the angularly formed sections 28, 29 and 30 of the top and bottom plates 19 and 20.

A heating wire or ribbon 31 is wound around the heating elements 33, 34 and 35 starting from the terminal screw 26 at the point designated as 32 and such winding is continued until the opposite connecting terminal is reached. The heater bearing element as shown consists of two or more plates made of asbestos or the like. These plates are provided with notches 36 (see Fig. 10); and are also provided with hollowed conductor conduits 37. The heating wire element is projected through the conduit 37. It then winds around the heater bearing elements and then leading out of the conduit opening 37ª through the conduit opening 38ª. The heating element is then wound around the next heater bearing element in the manner just described.

It will be understood that other heater elements than that described herein may be employed in connection with the present toaster.

A pair of elongated arms 38 and 39 are mounted inside the toaster proper. The arms aforesaid have curvilinear members projecting upward and outside of the toaster, and which have a handle 42 made of Bakelite or the like affixed between said members and secured thereto by means of the screws 43. The arms 38 and 39 are made secure to the body of the toaster by means of side projections 44 and 45. A pair of toasting racks 46 and 47 are hinged to the extension pieces 44 and 45 by means of rivets 48. (See Figs. 4 and 5.)

The racks 46 and 47 are partially cut away at the location designated as 49 as shown in Fig. 2. The cutting away of that portion of the racks 46 and 47 permits the heat waves coming from the heating elements to circulate throughout the racks aforesaid.

The springs 50 and 51 are provided to hold the racks 46 and 47 in the position shown in Fig. 4 when they are pushed out of the toaster by means of the handle 42. The movement of said racks on being pushed out of the container as stated describes that of a swinging arc, said movement terminating on the contacting of said racks upon the respective contact springs 50 and 51. When said racks are in the position as shown in Fig. 4, the toasted bread resting upon said racks at the angle indicated in said Fig. 4 is in position for the convenient and safe extraction of the toasted bread aforesaid. A pair of rods 52 and 53 serve to hold the racks 46 and 47 in vertical position. Another pair of curved circular wire rods 55 serve to hold the bread or the like in position while resting upon the toasting racks 46 and 47. Knobs 56 are secured to the sides 16 and 17 of the toaster to permit the user to hold the toaster firmly on the table or other surface upon which the toaster rests when pulling on the handle 42. A cover 57 secured at both sides of the arms 38 and 39 serves to cover up the openings 20 and 21 while the toaster is in operation.

The arms 38 and 39 are slidably mounted on the sides 13 and 14 through the medium of elongated slots which are centrally located on the side frames, the latter sliding back and forth in the space gap provided in the head and neck of the rivets 58.

The toaster shown in Figs. 6, 7, 8, and 9 is a modification of the toaster already described, the difference being that the modified toaster is provided with a time temperature controlling arrangement.

When the handle of the toaster as shown in Fig. 7 is pushed downward, the gear rack 59 secured to the arm 38 being in engagement with the train of gears 60 lifts the counterweight 61 in the position shown in the figure. The counterweight aforesaid by reason of gravity gradually drops after a certain elapsed time to the position shown by the counterweight in broken line and designated as 61ª. When this latter position shall have been reached, the handle of the push switch 62 is depressed, resulting in the opening of the contacts 63 thus breaking or opening the electric circuit.

The fall of the counterweight 61ª to the position as designated by the broken lines in Fig. 7, is regulated by a flywheel governor 64 (see Fig. 6) which is rotated by the shaft 65 (see Fig. 8) and the gear wheel 66 which in turn is rotated by the pinion 67, the latter being rotated by the gear wheel 68 which is secured to the counterweight arm 69 that is mounted on the shaft 70.

A brakeshoe 71 is located around the fly governor wheel 64. When the screw 72 is turned by the user by means of the handscrew 73 the brakeshoe may be compressed or expanded. Such adjustment causes the governor wheel to change its speed which in turn causes a variation of the speed of descent of the arm 69 and the time to effect the operation of the switch 63.

A ratchet wheel and pawl 74 serve to take up whatever lost motion is developed by the geared rack 59 when the toaster racks 46 and 47 are pulled up for loading by means of the handle 42.

A time scale adjustment as shown in Fig. 9 serves to set the time required for toasting the bread in the manner desired. The markings as shown enables the user to adjust the toaster to produce "soft," "medium," "hard," or "crisp" toast.

The foregoing detailed description has been given for clearness of understanding only and no unnecessary limitations should be understood therefrom, but it should be construed as broadly as permissible in view of the prior art.

The slidably mounted racks may also be arranged so that they are held in position by means of a spring and locked into position when said racks are inserted into the toaster by means of a locking arm which may be released by the weight 81 when said weight is in the position shown in broken line outline 61ª. In this manner the already toasted bread is pushed off the toaster when said toasting shall have been completed.

The arm and weight 61 may also operate a signal bell simultaneously with the switching off of the current when said weight is in the position designated as 61ª. A red or other light may also be incorporated in said toaster to indicate that the bread is toasted.

It is obvious that other indicating means may be employed to indicate to the user that the toasting process has been completed.

While the toaster herein illustrated and described is confined to certain structural details, I do not wish to limit myself to such details, but desire to cover all forms and arrangements which come within the scope of my invention, being only limited by the scope of the appended claims.

What I claim is—

1. A toaster of the class described comprising a container having rigidly secured side plates that rest upon a base plate; a top plate included in said container, said top plate having elongated slot openings; one or more slidably mounted racks in said container arranged to slide through said openings; a bracket also included in said container upon which said racks are pivotably mounted, and a handle included on said bracket, the operation of said handle causing said racks to move outwardly from said container, said movement being in the form of a swinging arc, and stopping means for said racks after said racks shall have completed the movement aforesaid.

2. A toaster of the class described, including an all enclosed container, the top portion of said container being open, one or more toasting racks slidably mounted inside said container, heating elements included in said container, a handle that is slidably mounted inside said container for the purpose of pushing in and pulling out said toaster racks from said container, the operation of said handle causing said racks to move outwardly and describing an arc-like movement from the open top of said container; means for facilitating said arc-like movement, and stopping means provided for said racks after said racks shall have completed said arc like movement, and said handle having means for positioning said racks in place while said racks are on either the outer or inner side of the container aforesaid.

3. A toaster of the class described comprising an all enclosed container having an open top; a bracket handle mounted upon and which slides in and out of said container; racks pivotably mounted on said bracket handle and arranged to angularly spread apart when pulled out of said container; electric heating elements in said container; and locking means for holding said bracket handle in position when said bracket handle is placed inside or outside of the container aforesaid.

4. A toasting device comprising an all enclosed container having an open top, a bracket handle slidably mounted upon said container, one or more racks mounted upon said bracket handle, said racks supporting bread or the like to be toasted inside said container, electric heating elements in said container contiguous to said racks, time controlling means included in said container to control the current flow into said heating elements, said timing means comprising a train of gears, a governor included therewith, a pivotally mounted weighted arm secured to and operating in connection with said train of gears, and means included in said container for lifting the weighted arm aforesaid.

5. A toaster of the class described including an all enclosed container, the top portion of said container being open, one or more toasting racks slidably mounted inside said container, a handle slidably mounted inside said container for the purpose of pushing in and pulling out said toaster racks from said container, the operation of said handle causing said racks to move outwardly and describing an arc-like movement from the open top of said container, means to facilitate said arc-like movement, and stopping means provided for said racks for the positioning thereof after said racks shall have completed the arc-like movement aforesaid.

6. A toaster of the class described including a container having rigidly secured side plates that rest upon a base plate, a top plate included in said container, said top plate being partially open, one or more slidably mounted racks in said container arranged to slide through said partially open top, a bracket also included in said container upon which said racks are pivotally mounted, and a handle included on said bracket for pulling said bracket and said racks in and out of the container aforesaid.

7. A toaster of the class described including an all enclosed container, said container having an open cover; one or more toaster racks slidably mounted inside said container, and a handle slidably mounted inside said container for the purpose of pulling said toaster racks in and out of said container, said handle being provided with springs for holding said racks in an angular or inclined position with respect to each other when said racks are pulled out of the container aforesaid.

CONSTANTINE P. LENT.